United States Patent [19]

Schreckling

[11] Patent Number: 5,528,903
[45] Date of Patent: Jun. 25, 1996

[54] SMALL GAS TURBINE

[75] Inventor: Kurt Schreckling, Leverkusen, Germany

[73] Assignee: Schneider-Sanchez Ges.m.b.H., St. Lambrecht, Austria

[21] Appl. No.: 307,717

[22] PCT Filed: Mar. 22, 1993

[86] PCT No.: PCT/EP93/00684

§ 371 Date: Sep. 20, 1994

§ 102(e) Date: Sep. 20, 1994

[87] PCT Pub. No.: WO93/18832

PCT Pub. Date: Sep. 30, 1993

[30] Foreign Application Priority Data

Mar. 20, 1992 [DE] Germany ................ 92 03 776.3 U

[51] Int. Cl.$^6$ .................................. F02C 7/224
[52] U.S. Cl. .................................. 60/736
[58] Field of Search ............... 60/39.31, 39.32, 60/39.36, 39.75, 734, 736, 737, 738, 747, 760, 267

[56]  References Cited

U.S. PATENT DOCUMENTS

| 2,588,728 | 3/1952 | Hundstad . | |
|---|---|---|---|
| 2,593,849 | 4/1952 | Clarke et al. | 60/738 |
| 2,595,765 | 5/1952 | Clarke et al. | 60/738 |
| 2,620,626 | 12/1952 | Lysholm . | |
| 2,694,899 | 11/1954 | Hague | 60/736 |
| 2,781,637 | 2/1957 | Dougherty | 60/736 |
| 2,958,189 | 11/1960 | Britton et al. | 60/736 |
| 3,955,360 | 5/1976 | Traut | 60/39.75 |
| 4,034,560 | 7/1977 | Chute . | |
| 4,333,309 | 6/1982 | Coronel | 60/736 |
| 4,850,195 | 7/1989 | Ohkubo et al. | 60/738 |

FOREIGN PATENT DOCUMENTS

| 178242 | 4/1986 | European Pat. Off. . |
|---|---|---|
| 967324 | 3/1950 | France . |
| 904255 | 11/1951 | Germany . |
| 968370 | 10/1956 | Germany . |
| 2616565 | 10/1977 | Germany . |
| 264091 | 9/1949 | Switzerland . |
| 347206 | 4/1931 | United Kingdom . |
| 656718 | 8/1951 | United Kingdom . |
| WO91/08421 | 6/1991 | WIPO . |

OTHER PUBLICATIONS

Society of Automotive Engineers; Johnson & Pedersen; Small Turbine Advanced Gas Generator . . .; Pub. No. 720831.

Primary Examiner—Timothy S. Thorpe
Attorney, Agent, or Firm—Karl Hormann

[57] ABSTRACT

A small gas turbine, in particular for powering airplane models, provided with a casing (3), a compressor rotor (1, 2), a combustion chamber (15-17) and a turbine rotor (5), the turbine rotor (5) driving the compressor rotor (1, 2) by a shaft positioned in a shaft tunnel extending through the combustion chamber (15-17) and surrounded by a helical fuel feed and vaporizing tube (22, 23), the combustion chamber (15-17) being defined by a cylindrical outer wall (15) and a frusto-conical inner wall (16) provided with combustion air intake orifices (19-21) the outlet side of the inner wall (16) of the combustion chamber extending into a cylindrical flow element (6, 7) forming an annular gap therewith, which in turn extends into the center opening of the turbine side guide vane ring (4) and is supported by the end (9) of the shaft tunnel (8), and the other end of the shaft tunnel (8) being secured to the casing (3) between the compressor rotor (1, 2) and the front wall (17) of the combustion chamber.

20 Claims, 3 Drawing Sheets

1

SMALL GAS TURBINE

The invention relates to a small gas turbine, in particular for propelling model aircraft, provided with a rotationally symmetrical casing, a compressor rotor at the fluid intake of the casing, a combustion chamber arranged within the casing and a turbine rotor with a stationary guide vane ring arranged forwardly thereof at the fluid outlet of the casing, the turbine rotor driving the compressor rotor by way of a shaft provided in a shaft tunnel extending through the combustion chamber, the tunnel being surrounded by a helical fuel feed and vaporizing tube arranged within the combustion chamber and feeding into it by means of nozzles.

A small gas turbine of this kind has been repeatedly disclosed by the present inventor: FMT Flug- u. Modelltechnik 405-10/89 pages 20/21; FMT Flug- und Modelltechnik 408-1/90 pages 52/53; FMT Flug- u. Modelltechnik Spezial Scale 89/90 pages 69/71; FMT Flug- u. Modelltechnik Spezial Scale Nr.1 90 pages 34/37 (all journals are published by Verlag fuer Technik und Handwerk, Baden-Baden, Germany). In accordance with the latest publications, the gas turbine designated "Strahlturbine FD3" (turbojet FD3) possesses the following technical specifications: The fuel used in flight operations is diesel fuel or a mixture of diesel fuel and gasoline. In a stationary operation, propane or butane, in gaseous or liquid state, may be used appropriately metered. The radial (centrifugal) compressor stage is provided with a rotor with backwardly curved blades and a cover plate. The turbine rotor is acting axially. Fuel is vaporized in a helical tube which also acts as a cooling coil for the shaft tunnel.

However, this state of the art still suffers from the following defects. In small gas turbines, the combustion of liquid fuel in a relatively small combustion chamber is especially problematical. Comparably sized small gas turbines, for instance for starting large turbo jet engines, preferably use reverse flow annular combustors or disc-shaped combustors. Either structure would, however, detrimentally increase mass and volume of a small gas turbine, particularly of the kind used for propelling model aircraft. An optimum combustor structure yielding uniform combustion with a stabilized flame front even under rapidly changing loads, has not yet been devised.

At the same time, there is the problem that the shaft tunnel in one way or another must extend through the combustion chamber, in order to drive of the antecedent compressor stage. This leads to thermal problems: In case of insufficient heat dissipation, the shaft tunnel supported by the guide vane ring at the turbine side, because of unavoidable temperature differences, causes deformation of the guide vane ring and, hence, an off-center displacement of the turbine rotor. To avoid any grinding contact, a relatively large free play of the turbine must be provided within the casing outlet, which results in a reduced internal efficiency of the turbine as well as the thrust/weight ratio. Furthermore, over-heating of the shaft tunnel often leads to a malfunction of the bearing of the turbine rotor supported in the outlet end of the wave tunnel and thus to a significantly reduced uniformity in the rotations of the turbine rotor as well.

Therefore, an optimum structure of the combustion chamber and its support must also take these thermal problems into consideration.

It is an object of the invention to provide a small gas turbine of the kind referred to at the outset, in which uniform stabilized combustion is attained even under rapid load changes and in which combustion heat is dissipated in a controlled manner.

Further objects of the invention reside in providing a gas turbine which for propelling model aircraft may preferably operated with diesel fuel; which in a stationary operation may optionally also be driven with gaseous fuels, preferably propane and/or butane gas, and which requires no adaptations or changes in the gas turbine when the kind of the fuel is changed; which attains a maximum thrust of about 30N at a thrust/weight ratio of at least 3; and which may be commercially manufactured.

In accordance with the invention these objects are accomplished in a gas turbine of the kind referred to in the introduction, by the combustion chamber being defined by a cylindrical outer wall and a frusto-conical inner wall surrounding the shaft tunnel and provided with combustion air intake orifices, the conical base of which faces the compressor rotor and is connected to the outer wall of the combustion chamber by way of an annular front wall, with the inner wall at the outlet side end of the combustion chamber extending, forming an annular gap, into a cylindrical flow element which in turn is positioned, forming an annular gap, in the center opening of the guide vane ring at the outlet and is supported by the end of the shaft tunnel, the other end of the shaft tunnel being secured to the casing between the compressor rotor and the front wall of the combustion chamber.

This construction and mounting of the combustion chamber ensures a uniform combustion with a stabilized flame front, even at rapid load changes when changing the fuel supply, as well as a thermal disjunction between the guide vane ring at the outlet side and the turbine rotor bearing.

It has been found that the preferred diameter of the inner wall of the combustion chamber at the base of the cone is 0.7 times the diameter of the outer wall of the combustion chamber, and that the width of the annular gap preferably is about 0.05 to 0.1 mm.

In order to mount the shaft tunnel in a vibration-free manner in this type of combustion chamber support in a vibration-safe way it is advantageous to secure the intake side end of the shaft tunnel to the casing by at least three braces radially extending between the compressor rotor and the front wall of the combustion chamber. In that case the braces may be affixed to the casing by radial bolts which also secure a cover radially extending over the compressor rotor but leaving the center intake section free, to provide for a gas turbine of simple construction.

The assembly of the small gas turbine is further simplified by the braces supporting a guide vane ring positioned at the intake between the compressor rotor and the front wall of the combustion chamber, such a ring being commonly provided in such turbines. The guide vane ring may at the same time be used to define the position of the shaft tunnel by an inner detent in the center opening of the guide vane ring at its intake side to provide a shoulder for securing the shaft tunnel.

Commercial manufacture is further facilitated by pressing the combustion chamber at the outlet side of its outer wall against the inner wall of the casing tapering in the fluid outlet direction, with compression springs acting between the intake side guide vane ring and the front wall of the combustion chamber.

In accordance with a preferred embodiment of the invention the mounting of the flow element at the end of the shaft tunnel provides for a substantially annular air flow gap aligned with an annular gap between the shaft tunnel and the outlet end of the inner wall of the combustion chamber. In this manner the inside of the inner wall of the combustion chamber serves at the same time to conduct cooling air to the outlet side section of the shaft tunnel, to the turbine rotor bearing, and to the center portion of the turbine rotor. Cooling of these elements is thus significantly amplified.

It has been found that the width of this air flow gap preferably should be about 0.25–0.5 mm.

In accordance with a further embodiment of the invention the hot end of the fuel feed and vaporizing tube is bent back toward the front wall of the combustion chamber and extends along the marginal section between the front wall and the inner wall of the combustion chamber as an annular manifold provided with nozzles. This provides for a uniform radially symmetric temperature distribution within the combustion chamber and, hence, for a uniform impact on the turbine stage, which is indispensable for a reliable operation. Preferably, this marginal section is, in cross-section, semi-circularly rounded off. Placing the manifold into a different position within the combustion chamber would result in an asymmetric temperature distribution at the annular manifold because of the flow of hot gas and the simultaneous emission of vaporized fuel from the nozzles, and thus in an asymmetric emission of the vaporized fuel which in turn leads to a non-uniform temperature distribution within the turbine stage.

The helical section of the fuel feed and vaporizing tube may be manufactured in a cost-efficient manner from one piece of tubing of heat resistant material. Preferably, the cross-sectional dimension of the fuel feed and vaporizing tube is periodically constricted at intervals of 1–2 cm, or a metal ball chain may be inserted into the fuel feed and vaporizing tube, with the diameter of the balls of the chain being somewhat less than the inner diameter of the fuel feed and vaporizing tube. Either measure improves heat transfer from the fuel feed and vaporizing tube to the fuel flowing therein, because the laminar flow within the tube is forced into turbulence.

A further advantageous embodiment of the invention is characterized by the front wall of the combustion chamber being provided with radial air intake slots disposed angularly relative to the axis of the casing. This results in flow turbulence within the combustion chamber, with a rotational axis the same as the axis of the casing, thus improving the uniform distribution and combustion of the vaporized fuel within the combustion chamber. For the same reason, it is advantageous to bend the margins of those combustion air intake orifices of the inner wall of the combustion chamber which are positioned close to the base of the cone away from the surface of the cone, so that the direction of these intake orifices extends at an angle with respect to the radial direction.

Preferably, the outer wall of the combustion chamber is provided with adjustable air flaps to allow fine tuning of the temperature gradient in a radial direction at the turbine stage.

Advantageously, the edge of the outer wall of the combustion chamber at the outlet side supported by the inner wall of the casing is also provided with air slots to provide for air flow to the rear section of the combustion chamber.

In the small gas turbine in accordance with the invention it is particularly advantageous to utilize as the compressor rotor a radially (centrifugally) compressing rotor provided with a cover ring and rotor blades deflected in the outlet direction. This results in a compressor stage of very high internal efficiency at a minimum effort as regards the guide system. The axial play of a covered compressor rotor is relatively uncritical. The backward deflection of the blades results in a compressor rotor which during start-up acts as a turbine, so that a very small blower with less than 20 W output power is sufficient to start the small gas turbine.

Preferably, the blade height at the intake of the compressor rotor is at least 1.5 times the vane height at the outlet. The invention will hereinafter be described in detail with reference to an embodiment depicted in the accompanying drawings. In the drawings:

FIG. 1 depicts an axial section of a small gas turbine in accordance with the invention;

FIGS. 2 and 3 schematically depict the structure of the jets in the annular manifold;

Figure 1:
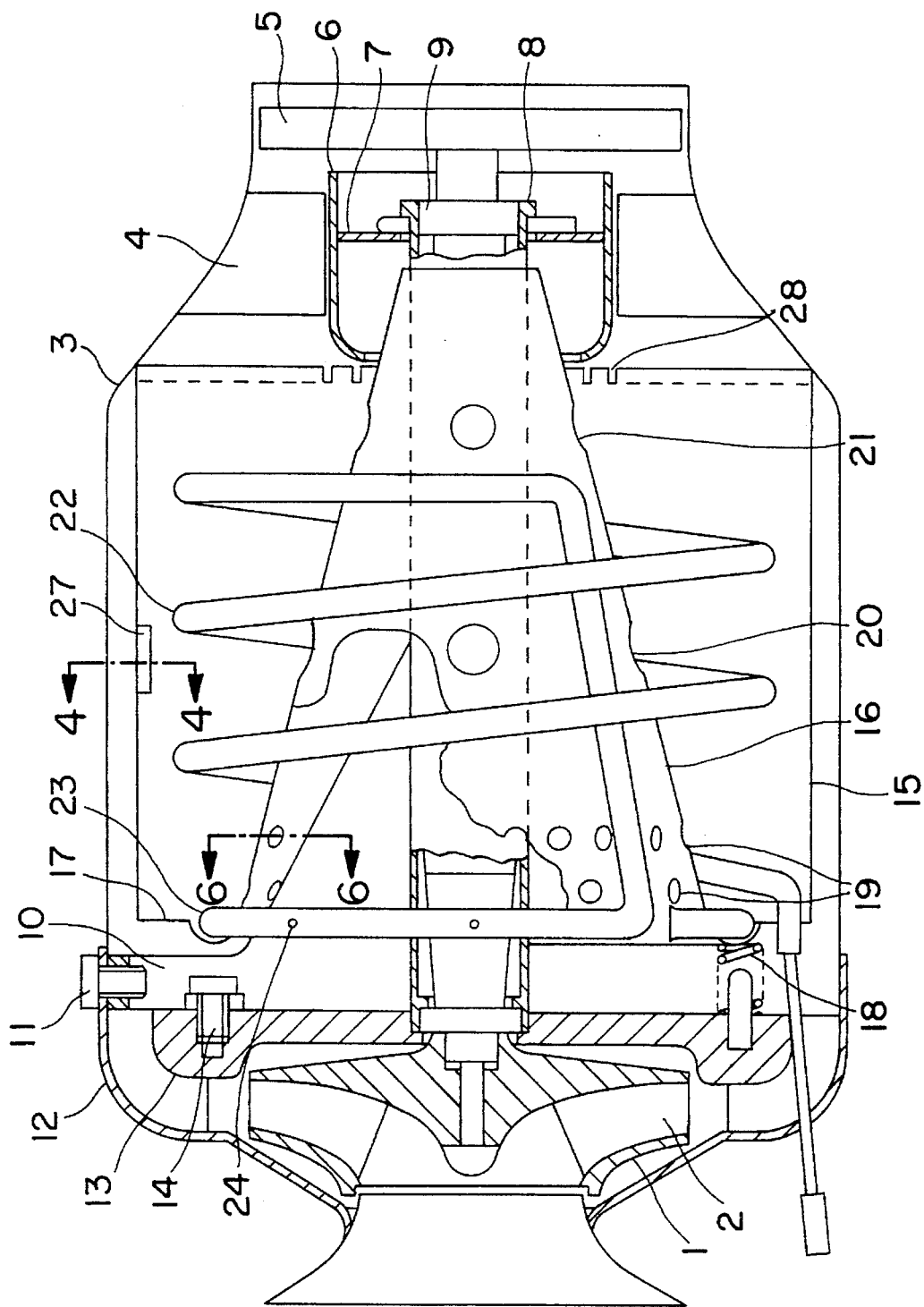
Figure 2:
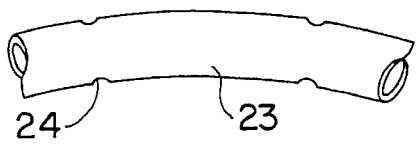
Figure 3:
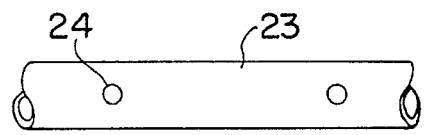
Figure 4:
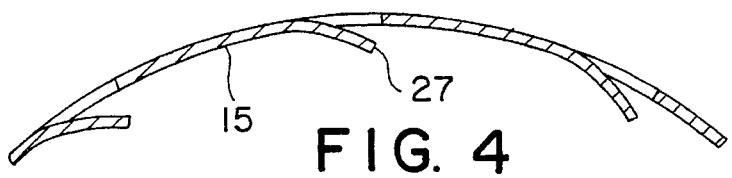
FIGS. 4 and 5 show the structure of the air flaps in the outer wall of the combustion chamber.
Figure 5:
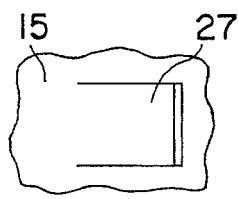
Figure 6:
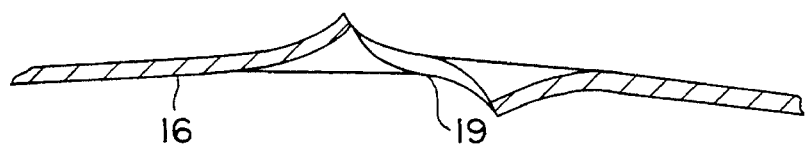
FIGS. 6 and 7 show the structure of the combustion air intake orifices in the inner wall of the combustion chamber at the intake side.
Figure 7:
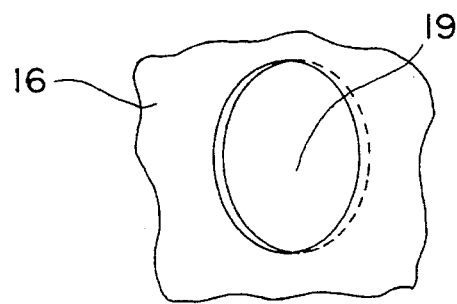
Figure 8:
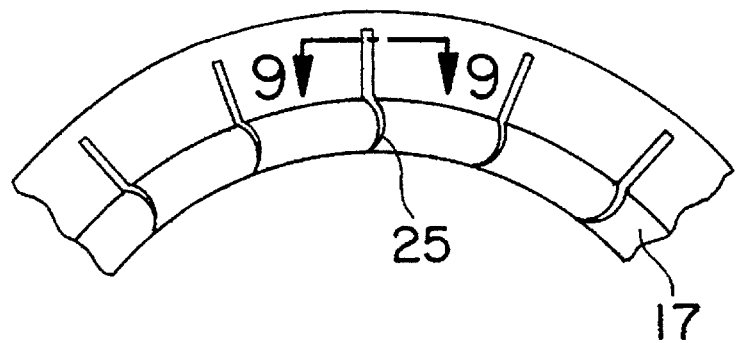
FIGS. 8 and 9 show the structure of the air slots in the front wall of the combustion chamber.
Figure 9:
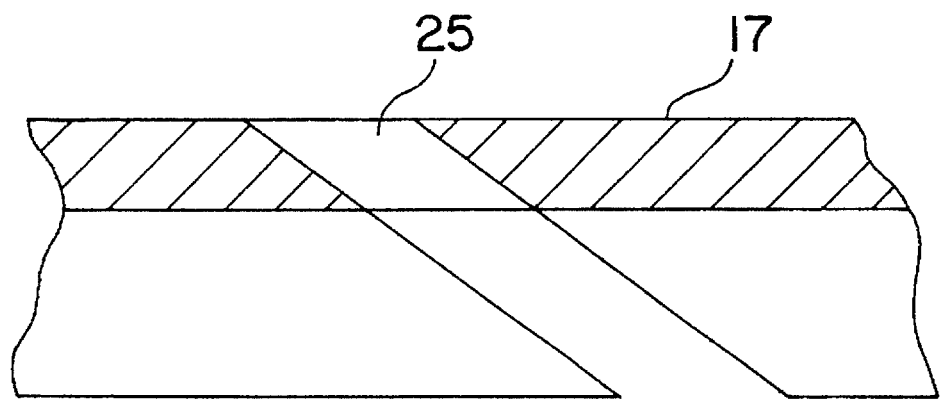
Figure 10:
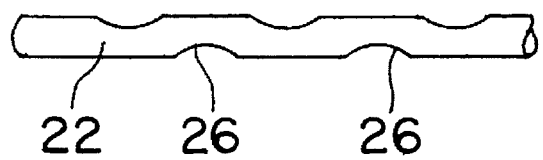
FIG. 10 depicts the constrictions in the fuel feed and vaporizing tube.

The small gas turbine depicted in the drawings is particularly suited for powering model aircraft and comprises a rotationally symmetric casing 3, a compressor rotor 1, 2 in the fluid intake of the casing a combustion chamber 15–17 arranged within the casing, and a turbine rotor 5 in the fluid outlet of the casing. A stationary guide vanes ring 4 is positioned in front of the turbine rotor 5.

The turbine rotor 5 drives the compressor rotor 1, 2 by means of a shaft which is positioned in a shaft tunnel 8 extending through the combustion chamber 15–17. The shaft tunnel 8 is surrounded by a helical fuel feed and vaporizing tube 22, 23 arranged within the combustion chamber and opening into it by way of nozzles 24.

The combustion chamber 15–17 is defined by a cylindrical outer wall 15, a frusto-conical inner wall 16, and a circular front wall 17.

The inner wall 16 of the combustion chamber surrounds the shaft tunnel 8 and is provided with combustion air intake orifices 19–21. The base of the cone of the inner wall 16 of the combustion chamber faces the compressor rotor 1, 2 and is connected with the outer wall 15 of the combustion chamber by means of the front wall 17 of the combustion chamber.

The outlet side end of the inner wall 16 of the combustion chamber extends into a cylindrical flow element 6, 7 forming an annular gap between them. The cylindrical flow element 6, 7 is in turn positioned in the center opening of the circular vane ring 4, forming an annular gap, and is supported by the shaft tunnel 8.

The other end of the shaft tunnel 8 secured to the casing 3 between the compressor rotor 1, 2 and the front wall 17 of the combustion chamber.

The diameter of the inner wall 16 of the combustion chamber at the base of the cone is 0.7 times the diameter of the outer wall 15 of the combustion chamber. The width of the annular gap between the flow element 6, 7 and the guide van ring 4 at the turbine side is about 0.05–0.1 mm.

The end of the shaft tunnel 8 at the intake side is secured to the casing 3 by at least three braces 10 which radially extend between the compressor rotor 1, 2 and the front wall 17 of the combustion chamber. The braces are fastened to the casing by radial bolts 11 which also secure a cover 12 extending over the compressor rotor 1, 2 but leaving its fluid intake center open. The braces 10 additionally support a guide vane ring 13 arranged at the intake side between the compressor rotor 1, 2 and the front wall 17 of the combustion chamber.

The center opening of the guide vane ring 13 at the intake side is provided with an inner detent which provides a shoulder for axially securing the shaft tunnel 8.

By way of its outer wall 15 at the outlet side the combustion chamber 15–17 is pressed against the inner wall of the casing 3 which narrows in the direction of fluid outlet, by at least two compression springs 18 which act between the guide vane ring 13 at the intake and the front wall 17 of the combustion chamber.

The mounting of the flow element 6, 7 at the end of the shaft tunnel 8 is such that a substantially annular air flow gap results which is aligned with an annular gap between the shaft tunnel 8 and the end of the inner wall 16 of the combustion chamber at the outlet side. The width of the air flow gap between the flow element 6, 7 and the shaft tunnel 8 is about 0.25–0.5 mm.

The hot end of the fuel feed and vaporizing tube 22, 23 is bent back to the front wall 17 of the combustion chamber and extends along the marginal section between the front wall 17 and the inner wall 16 of the combustion chamber as an annular manifold 23 provided with nozzles 24. In cross section, the marginal section is of semicircular configuration.

The cross-section of the fuel feed and vaporizing tube 23, 24 is narrowed by constrictions 26 at intervals of 1–2 cm. Alternatively, a metal ball chain may be inserted into the fuel feed and vaporizing tube 22, 23, the diameter of the balls of which is somewhat smaller than the internal diameter of the fuel feed and vaporizing tube.

The front wall 17 of the combustion chamber is provided with radial air intake slots 25 the longitudinal direction of which extends angularly relative to the axis of the casing.

The margins of those combustion air intake orifices 19 of the inner wall 16 of combustion chamber which are located near the base of the cone, have been pried out of the surface of the cone so that these intake orifices are directed at an angle relative to the radial direction.

The outer wall 15 of the combustion chamber is further provided with adjustable air flaps. The flaps are adjusted by bending more or less preferably in the direction of the combustion chamber.

The front edge of the outer wall 15 of the combustion chamber supported by the inner wall of the casing is provided with air slots 28.

The compressor rotor 1, 2 compresses in a radial direction, is provided with a cover ring 1 and its blades 2 are deflected in the outlet direction. The height of the blades at the intake of the compressor rotor 1, 2 is at least 1.5 times larger than the height of the blades at the outlet.

What is claimed is:

1. Small gas turbine, in particular for powering model aircraft, comprising a rotationally symmetric casing (3), a compressor rotor (1, 2) at the fluid intake of the casing, a combustion chamber (15-17) arranged within the casing and a turbine rotor (5) in the fluid outlet of the casing provided with a stationary guide vane ring (4) positioned in front thereof, the turbine rotor (5) driving the compressor rotor (1, 2) by a shaft provided in a shaft tunnel (8) extending through the combustion chamber (15-17), the shaft tunnel being surrounded by a helical fuel feed and vaporizing tube (22, 23) arranged within the combustion chamber and communicating with it by nozzles (24), characterized by the combustion chamber (15-17) being defined by a cylindrical outer wall (15) and a frusto-conical inner wall (16) surrounding the shaft tunnel (8) and provided with combustion air intake orifices (19–21), the base of the cone of which faces the compressor rotor (1, 2) and is connected with the outer wall (15) of the combustion chamber by a circular front wall (17), the outlet side end of the inner wall (16) of the combustion chamber extending into a cylindrical flow element (6, 7) forming an annular gap therewith, which element is in turn positioned within the center opening of the outlet side guide vane ring (4) forming an annular gap therewith and is supported by the end of the shaft tunnel (8), and the other end of the shaft tunnel (8) being secured to the casing between the compressor rotor (1, 2) and the front wall (17) of the combustion chamber.

2. Small gas turbine in accordance with claim 1, characterized by the diameter of the inner wall (16) of the combustion chamber at the base of the cone being 0.7 times the diameter of the outer wall (15) of the combustion chamber.

3. Small gas turbine in accordance with claim 1, characterized by the width of the annular gap between the flow element (6, 7) and the guide vane ring (4) at the turbine side is about 0.05–0.1 mm.

4. Small gas turbine in accordance with claim 1, characterized by the intake side end of the shaft tunnel (8) being secured to the casing (3) by at least three braces (10) radially extending between the compressor rotor (1, 2) and the front wall (17) of the combustion chamber.

5. Small gas turbine in accordance with claim 4, characterized by the braces (10) being fastened to the casing (3) by radial bolts (11) which also secure a cover (12) extending over the compressor rotor (1, 2) and leaving its fluid intake center open.

6. Small gas turbine in accordance with claim 4, characterized by the braces (10) supporting a guide vane ring (13) at the intake side between the compressor rotor (1, 2) and the front wall (17) o the combustion chamber.

7. Small gas turbine in accordance with claim 6, characterized by the center opening of the intake side guide vane ring (13) being provided with an inner detent providing a shoulder for axially securing the shaft tunnel (8).

8. Small gas turbine in accordance with claim 6, characterized by the combustion chamber (15-17) being pressed by the end of its outer wall (15) at the outlet side against the inner wall of the casing (3) narrowing in the direction of fluid outlet by compression springs (18) acting between the intake side guide vane ring (13) and the front wall (17) of the combustion chamber.

9. Small gas turbine in accordance with claim 1, characterized by the mounting of the flow element (6, 7) at the end of the shaft tunnel (8) providing a substantially annular air flow gap aligned with an annular gap between the shaft tunnel (8) and the outlet side end of the inner wall (16) of the combustion chamber.

10. Small gas turbine in accordance with claim 9, characterized by the width of the air flow gap between the flow element (6, 7) and the shaft tunnel (8) being about 0.25–0.5 mm.

11. Small gas turbine in accordance with claim 1, characterized by the hot end of the fuel feed and vaporizing tube (22, 23) being bent back toward the front wall (17) of the combustion chamber and extends along the marginal section between the front wall (17) and the inner wall (16) of the combustion chamber as an annular manifold 23 provided with nozzles (24).

12. Small gas turbine in accordance with claim 11, characterized by the marginal section being in cross-section semi-circularly rounded off.

13. Small gas turbine in accordance with claim 1, characterized by the cross-section of the fuel feed and vaporizing tube (23, 24) being narrowed by constrictions (26) at intervals of 1–2 cm.

14. Small gas turbine in accordance with claim 1, characterized by a metal ball chain being inserted into the fuel feed and vaporizing tube (22, 23), the diameter of the balls of which is slightly less than the internal diameter of the fuel feed and vaporizing tube.

15. Small gas turbine in accordance with claim 1, characterized by the front wall (17) of the combustion chamber being provided with radial air intake slots (25) the longitudinal direction of which extends angularly relative to the axis of the casing.

16. Small gas turbine in accordance with claim 1, characterized by the margins of the combustion air intake orifices (19) of the inner wall (16) of the combustion chamber are located near the base of the cone, are pried out of the surface of the cone so that the direction of the intake orifices (19) extends angularly relative to the radial direction.

17. Small gas turbine in accordance with claim 1, characterized by the outer wall (15) of the combustion chamber being provided with adjustable air flaps (27).

18. Small gas turbine in accordance with claim 1, characterized by the outlet side front edge of the outer wall (15) of the combustion chamber supported at the inner wall of the casing (3) being provided with air slots (28).

19. Small gas turbine in accordance with claim 1, characterized by the compressor rotor (1, 2) compressing in a radial direction, being provided with an annular cover (1) and that its blades (2) are deflected in the outlet direction.

20. Small gas turbine in accordance with claim 19, characterized by the height of the blades at the intake of the compressor rotor (1, 2) being at least 1.5 times the height of the blades at the outlet.

\* \* \* \* \*